(12) United States Patent
Jackson et al.

(10) Patent No.: US 6,611,995 B2
(45) Date of Patent: Sep. 2, 2003

(54) CORNER MOUNT PACKAGE ASSEMBLY

(75) Inventors: Stephen D. Jackson, Stockton, CA (US); Raymond S. Brown, Modesto, CA (US)

(73) Assignee: USA Products, Lodi, CA (US)

( * ) Notice: Subject to any disclaimer, the term of this patent is extended or adjusted under 35 U.S.C. 154(b) by 0 days.

(21) Appl. No.: 10/013,384

(22) Filed: Dec. 7, 2001

(65) Prior Publication Data
US 2003/0106187 A1 Jun. 12, 2003

(51) Int. Cl.[7] .......................... A44B 21/00; B65D 75/56; B60P 7/10
(52) U.S. Cl. .................. 24/298; 24/16 R; 24/68 CD; 24/698.1; 24/909; 206/388; 410/41; 410/99
(58) Field of Search .................... 24/68 CD, 68 B, 24/298, 698.1, 16 R, 909; 410/41, 99; 242/388.2; 206/388

(56) References Cited

U.S. PATENT DOCUMENTS

| | | | | |
|---|---|---|---|---|
| 749,834 A | * | 1/1904 | Beisel | 206/388 |
| 968,455 A | * | 8/1910 | Eastabrook | 410/41 |
| 1,897,138 A | | 2/1933 | North | |
| 2,266,181 A | * | 12/1941 | Epps | 206/41 |
| 3,152,693 A | * | 10/1964 | Anderson | 206/388 |
| 3,796,304 A | * | 3/1974 | Blais | 206/388 |
| 4,011,632 A | | 3/1977 | MacDonald | |
| 4,450,961 A | | 5/1984 | Bies et al. | |
| 4,525,113 A | * | 6/1985 | Colman | 410/41 |
| 4,938,357 A | * | 7/1990 | Schmidt | 206/388 |
| 5,340,250 A | | 8/1994 | Meriwether et al. | |
| 5,584,623 A | * | 12/1996 | Nadherny | 410/99 |
| 5,848,865 A | | 12/1998 | Beals | |
| 5,878,548 A | | 3/1999 | Sauer et al. | |
| 6,006,908 A | | 12/1999 | Jackson et al. | |
| 6,006,909 A | | 12/1999 | Dunne | |
| 6,195,848 B1 | | 3/2001 | Jackson et al. | |

* cited by examiner

Primary Examiner—Victor Sakran
(74) Attorney, Agent, or Firm—Gray Cary Ware & Freidenrich LLP

(57) ABSTRACT

A corner mount packaging assembly for retail display of a tie-down assembly and for protection of a right angle edge of a load secured by the tie-down assembly. The packaging assembly includes an L-shaped frame with an inner surface adapted for placement over a right angle edge of the load, and an outer surface having guide members extending along side edges of the frame. The tie down assembly is removably attached to the inner surface of the frame, and includes a strap, hook type fasteners on the strap ends, and a tensioning mechanism for imparting a tension to the strap. The guide members form a channel on the outer surface for receiving the strap to prevent the strap from sliding off the frame, and the rigid L-shaped frame dissipates the force of the strap over a wider portion of the load, thus preventing damage thereto.

7 Claims, 5 Drawing Sheets

CORNER MOUNT PACKAGE ASSEMBLY

FIELD OF THE INVENTION

The present invention relates to a packaging and retail display article, and more particularly to a packaging and retail display article for displaying tie-down assemblies.

BACKGROUND OF THE INVENTION

Typical tie-down assemblies consist of a rope, cord, line, or webbing strap with fasteners, such as hooks, at either end that attach to fixed points, and a tensioning mechanism, such as a ratchet assembly for imparting tension to the rope, cord, line or strap to secure a load in place. Other types of tie-down assemblies include ropes, cords, lines or straps that are themselves elastic and that can be pulled taut to secure a load under tension. These tie-down assemblies can vary in size and load-bearing capability and therefore can be used to secure both heavy and lighter weight loads. Tie-down assemblies are used, for example, in the hauling and transport of cargo and freight, as well as for securing gear for activities such as camping or boating or other marine applications. Tie-down assemblies are routinely packaged for shipment and display in disposable transparent plastic packages or containers. Common forms of packaging include a pre-formed transparent plastic piece configured to correspond to the shape of the packaged article adhered to a cardboard backing, or a pair of pre-formed transparent plastic pieces configured to correspond to the shape of the packaged article that snap-fit or are welded together along their periphery. These packaging materials have no utility other than for display purposes, and therefore, once a customer purchases the tie-down assembly, the packaging materials are discarded as refuse.

At the same time, users of tie-down assemblies have a need for accessories that aid the user in the use and storage of the tie-down assembly. For example, there is a desire to maintain the tension straps or cords at a fixed position on the load itself and to prevent movement of the tension straps or cords. Articles that provide guide slots for orienting the tension straps or lines and maintaining the tension straps or lines in place are therefore useful when using a tie-down assembly to secure a load. Also, the tension imparted on the secured load by the tensioned straps or cords can sometimes cause damage to edges of the load. Articles that provide protection to edges of loads by distributing the force imparted by the tensioning strap or cord across a broader surface area of the secured load are useful in avoiding or minimizing damage to the load edge.

Therefore, there would be an environmental benefit to providing a packaging article for tie-down assemblies that was recyclable for secondary uses, and there would be a further benefit for a consumer to provide for a packaging material that had utility in the use of the purchased tie-down assembly during the lifespan of the tie-down assembly.

SUMMARY OF THE INVENTION

The present invention is a corner mount package assembly for securing a load having a right angle edge, the assembly including a substantially L-shaped frame having inner and outer surfaces, wherein the inner surface has a pair of surface portions oriented approximately 90° from each other and the outer surface has a pair of surface portions oriented approximately 270° from each other, a tie-down assembly that includes a flexible strap and is removably attached to the inner surface of the frame, a loop or hook extending from a top edge of the frame, and opposing guide members extending up from the outer surface and along first and second side edges of the outer surface, wherein the opposing guide members define a channel that extends along the pair of outer surface portions. The L-shaped inner surface is adapted to be positioned over the right angle edge of the load and the channel is adapted to receive the strap once the tie-down assembly is removed from the inner surface of the frame.

In another aspect of the present invention, a corner mount package assembly for securing a load having a right angle edge includes a substantially L-shaped frame and a tie-down assembly. The L-shaped frame includes a generally planar first frame portion having top and bottom edges, first and second side edges, and first and second surfaces, and a generally planar second frame portion having top and bottom edges, first and second side edges, and first and second surfaces. The first frame portion bottom edge is joined to the second frame portion top edge so that the first surfaces of the first and second frame portions are oriented approximately 90° from each other to form a substantially L-shaped inner surface, and so that the second surfaces of the first and second frame portions are oriented approximately 270° from each other to form a substantially L-shaped outer surface. The tie-down assembly includes a flexible strap and is removably attached to the inner surface of the frame. A loop or hook extends from the top edge of the first frame portion. Opposing guide members extend up from the outer surface and along the first and second side edges of the first and second frame portions. The opposing guide members define a channel that extends along the outer surface. The L-shaped inner surface is adapted to be positioned over the right angle edge of the load and the channel is adapted to receive the strap once the tie-down assembly is removed from the inner surface of the frame.

Other objects and features of the present invention will become apparent by a review of the specification, claims and appended figures.

DETAILED DESCRIPTION OF THE PREFERRED EMBODIMENTS

Figure 1:
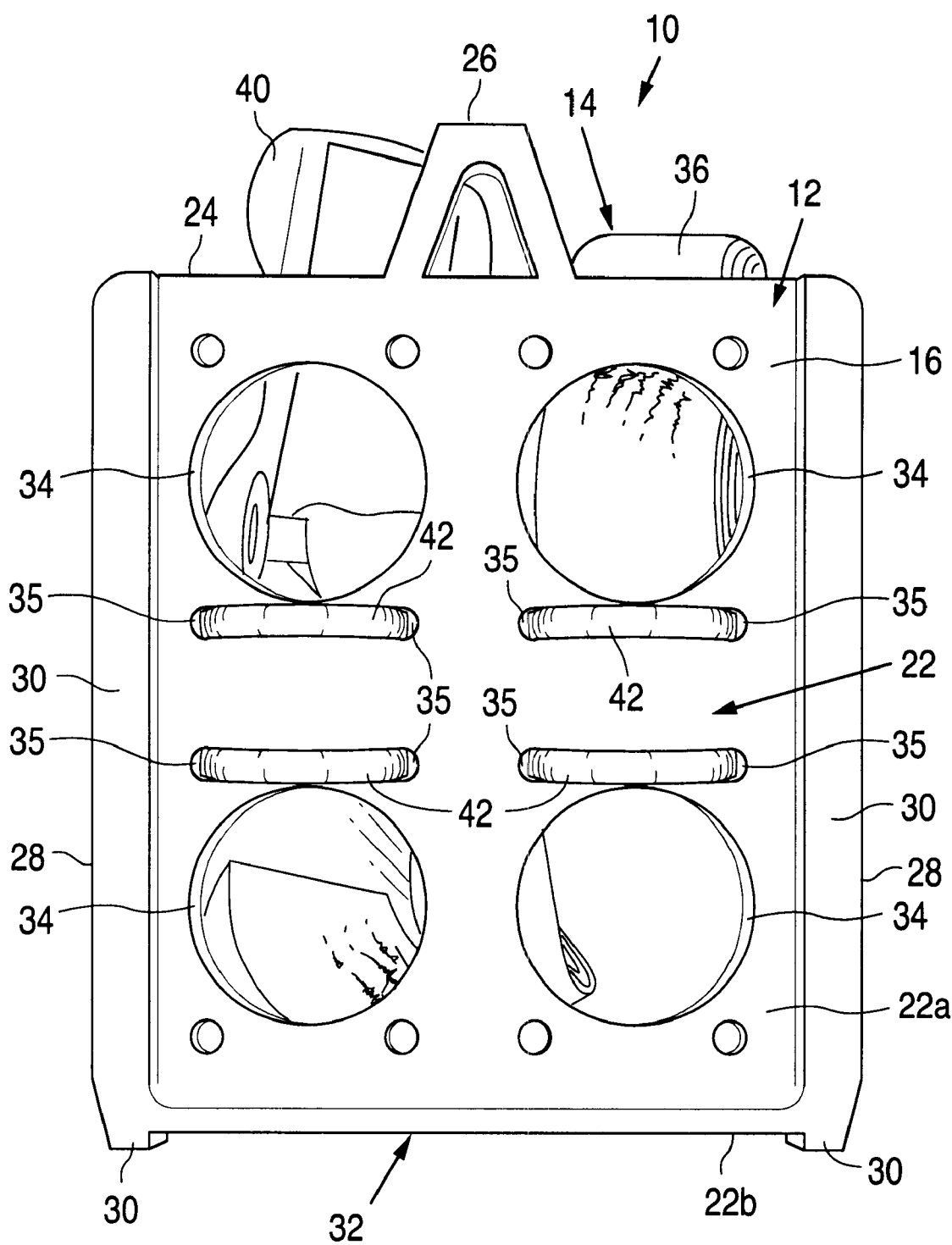
FIG. 1 is a back side view of the corner mount package assembly of the present invention.
Figure 2:
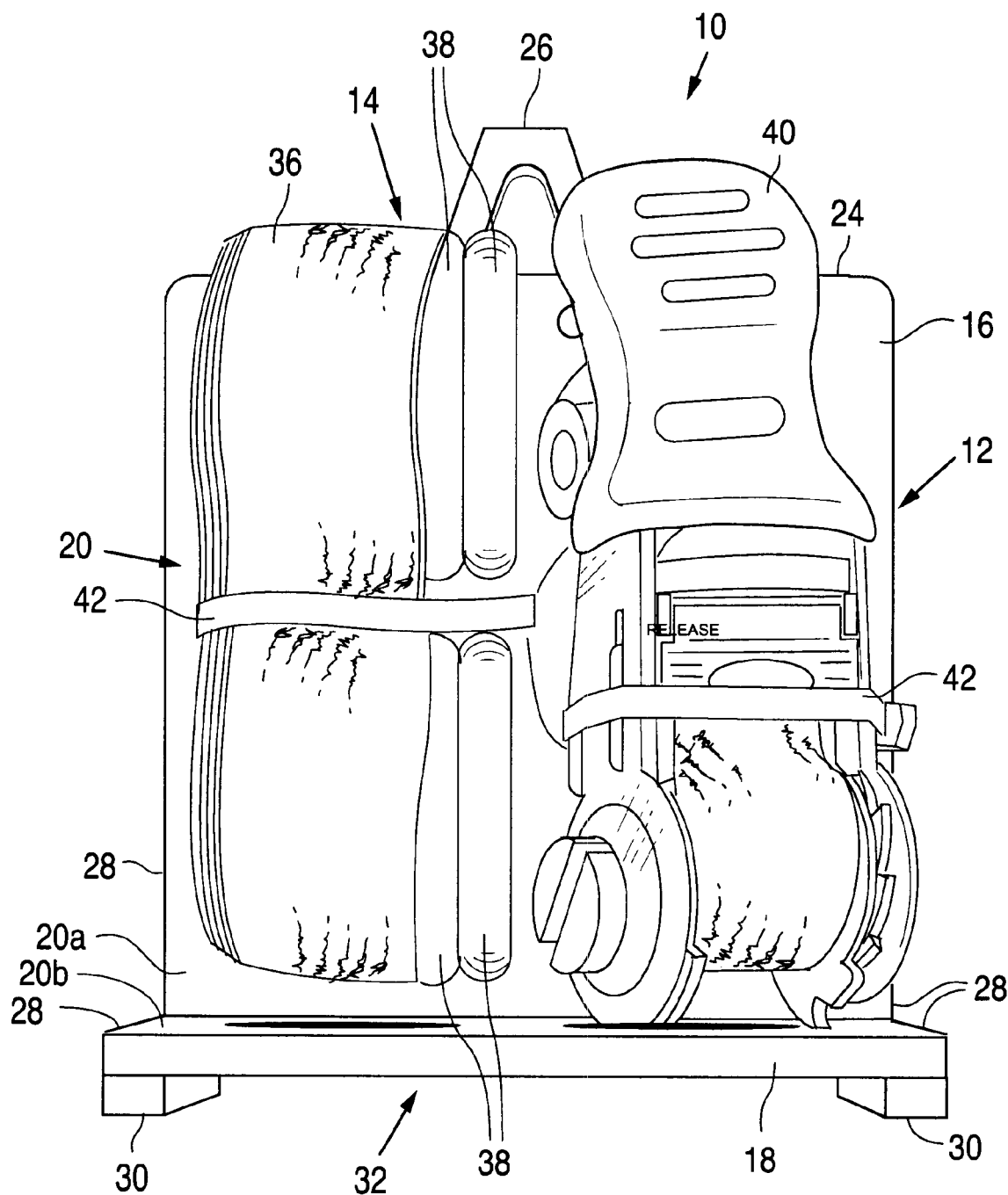
FIG. 2 is a front side view of the corner mount package assembly of the present invention.
Figure 3:
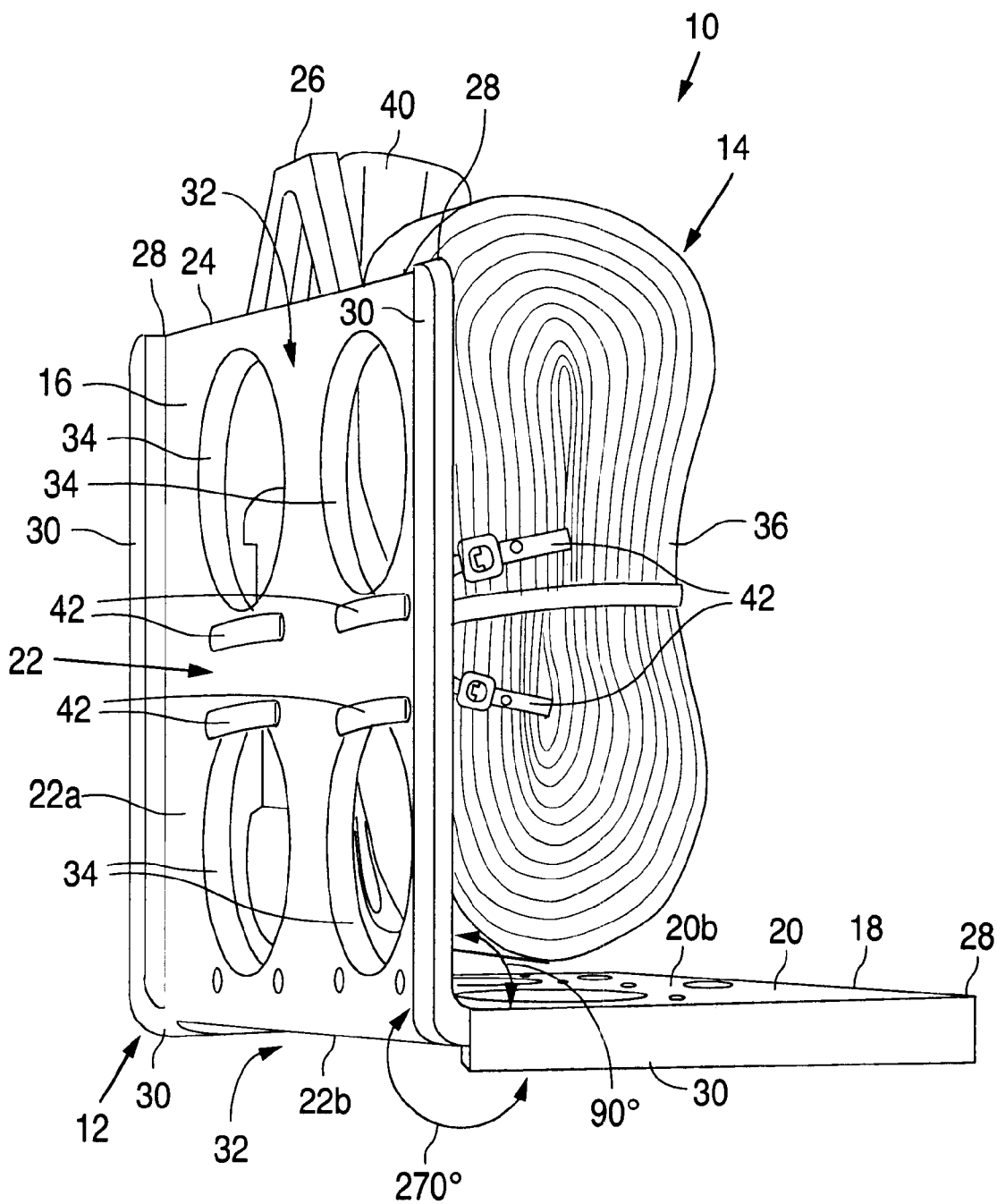
FIG. 3 is a side perspective view of the corner mount package assembly of the present invention.

The present invention is a corner mount package assembly 10 as illustrated in FIGS. 1–3, and includes an L-shaped frame 12 and one or more tie-down assemblies 14 attached thereto.

Frame 12 includes upper and lower planar frame portions 16 and 18 that are formed or attached together at substantially a right angle. The upper/lower frame portions 16/18 together form a right angle inner surface 20 having portions 20a and 20b, respectively, that are oriented substantially 90° from each other, and a right angle outer surface 22 having portions 22a and 22b, respectively, that are oriented substantially 270° from each other. Upper frame portion 16 has a top edge 24 with a loop or hook 26 extending therefrom. Frame 12 can be made of any of a variety of conventional materials having sufficient strength and rigidity. The preferred material is a thermoplastic resin, such as a polyethylene or a polypropylene that can be injection molded into the desired configuration by methods known in the art.

Upper/lower frame portions 16/18 have side edges 28, along which guide members 30 extend outwardly from outer surface 22. The guide members 30 define a thin channel 32 therebetween that extends along outer surface 22 of frame 12.

A plurality of mounting apertures 34 are formed in the upper/lower frame portions 16/18. Mounting apertures 34 each preferably have a width or diameter that is equal or greater than the width of the straps in the tie-down assembly. A plurality of fastening apertures 35 are also formed in frame 12.

Tie-down assembly 14 includes a flexible tension strap, cord, rope, bungee or line (hereinafter referred to generally as 'strap') 36 that is wound around upon itself or upon a separate reel, a pair of hook-type fasteners 38 each attached to one end of the strap 36, and a tensioning mechanism 40 attached to the strap 36 for imparting (i.e. creating and/or maintaining) tension to the strap 36 to secure a load in place. Examples of tensioning mechanisms 40 include ratchet assemblies (shown in the figures), cam buckles (cam with retaining member), over-center buckles (uses friction fit), etc, which are well known in the art. Strap 36 can be either non-elastic or elastic. Tie-down assembly 14 is removably secured to the frame 12 preferably using cable or twist ties 42 that wrap around tie-down assembly 14 and engage with fastening apertures 35. However, tie-down assembly 14 can be secured to frame 12 using any means that removably secure these elements together, such as shrink wrap (wrapped around tie-down assembly 14 and frame 12), tape, adhesive, clips, stretch wrap, etc.

The corner mount package assembly 10 can be hung from a pegboard or free-standing rack by loop 26 for retail sales display of the frame 12 and attached tie-down assembly 14 in a space efficient manner. Loop 26 is positioned to facilitate self centering of the corner mount package assembly hung on a retail peg board, also allows for convenient storage of the frame 12 between uses. Once purchased, the user removes the cable/twist ties 42 to release the tie-down assembly 14 from the frame 12. The tie-down assembly 14 can be re-secured back to the frame 12 in much the same manner using any appropriate fastening means to store the package assembly 10 in an organized fashion when not in use.

Figure 4:
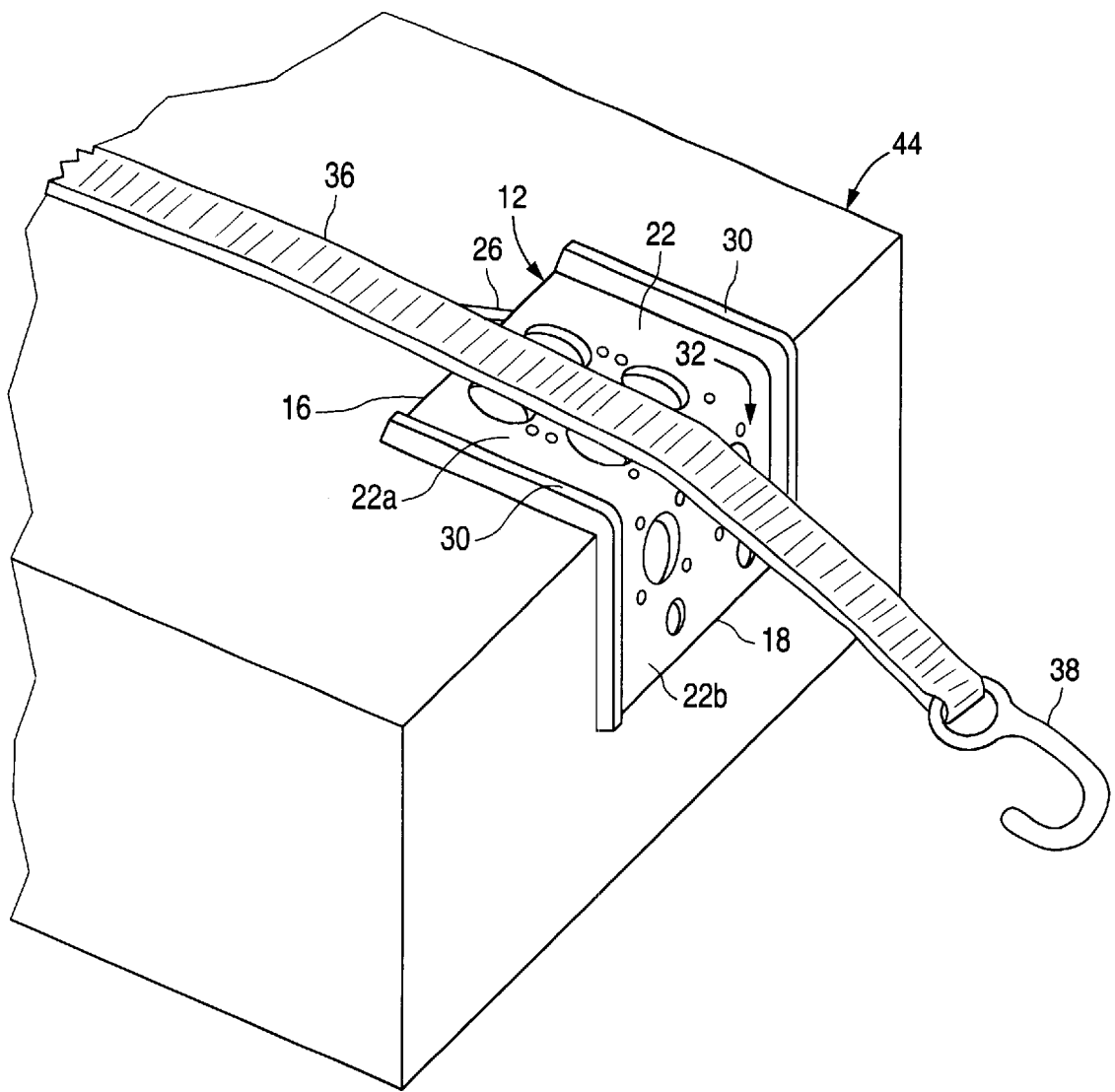
FIG. 4 is a perspective view of the L-shaped frame of the present invention disposed over a corner edge of a load.
Figure 5:
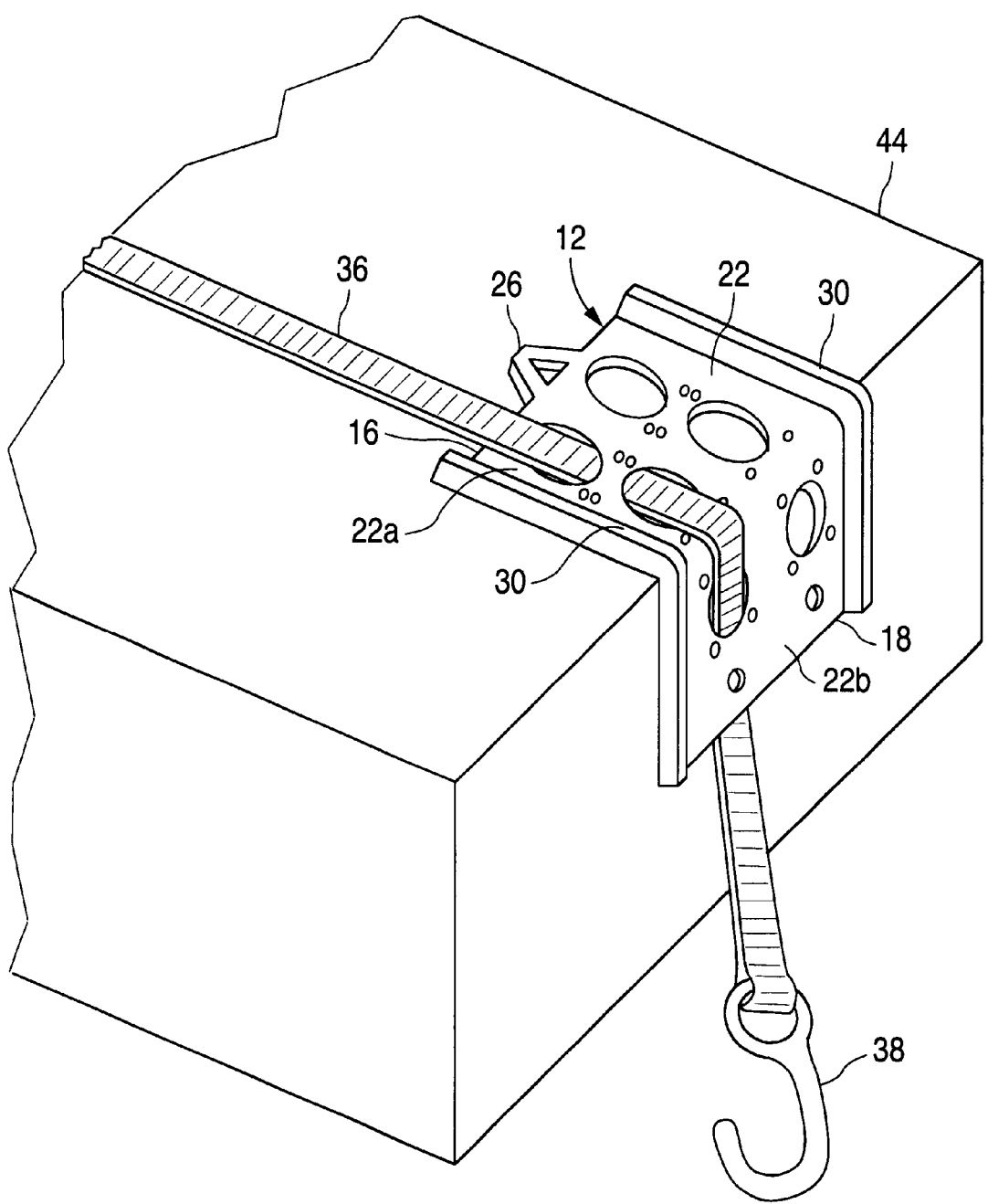
FIG. 5 is a perspective view of the L-shaped frame of the present invention disposed over a corner edge of a load, with the strap fed through the mounting apertures.

Not only does the corner mount package assembly of the present invention provide for retail display of the frame 12 and tie-down assembly 14, but the L-shape configuration of planar frame portions 16/18 allows frame 12 to effectively function as both a tension strap guide and an edge protector when the frame 12 is used in conjunction with the tie-down assembly 14 to secure a load. Specifically, once the tie-down assembly 14 is removed from the frame 12, the inner surface 20 is placed over a right angle edge of a load 44, as shown in FIG. 4. The strap 36 of the tie-down assembly is secured over the load and through the channel 32 along the outer surface 22 of the frame 12. The guide members 30 prevent the strap 36 from sliding off the frame 12 both while the strap is being tightened, and during transportation or other movement of the load. Moreover, the strap 36 can be fed through the mounting apertures 34 to better secure the strap 36 to the frame 12, and prevent frame 12 from flying off and getting lost, as shown in FIG. 5. The rigid L-shaped frame 12 dissipates the force of the strap over a wider portion of the corner edge of the load 44, thus preventing damage thereto.

It is to be understood that the present invention is not limited to the sole embodiment described above and illustrated herein, but encompasses any and all variations falling within the scope of the appended claims.

What is claimed is:

1. A corner mount package assembly for securing a load having a right angle edge, comprising:
   a substantially L-shaped frame that includes:
      a generally planar first frame portion having top and bottom edges, first and second side edges, and first and second surfaces, and
      a generally planar second frame portion having top and bottom edges, first and second side edges, and first and second surfaces,
      wherein the first frame portion bottom edge is joined to the second frame portion top edge so that the first surfaces of the first and second frame portions are oriented approximately 90° from each other to form a substantially L-shaped inner surface, and so that the second surfaces of the first and second frame portions are oriented approximately 270° from each other to form a substantially L-shaped outer surface;
   a tie-down assembly that includes a flexible strap, wherein the tie-down assembly is removably attached to the inner surface of the frame;
   a loop or hook extending from the top edge of the first frame portion; and
   opposing guide members extending up from the outer surface and along the first and second side edges of the first and second frame portions, wherein the opposing guide members define a channel that extends along the outer surface;
   wherein the L-shaped inner surface is adapted to be positioned over the right angle edge of the load and the channel is adapted to receive the strap once the tie-down assembly is removed from the inner surface of the frame.

2. The assembly of claim 1, further comprising:
   shrink wrap material wrapped around and removably attaching together the frame and the tie-down assembly.

3. The assembly of claim 1, further comprising:
   fastening apertures formed in the L-shaped frame; and
   fastening ties engaged with and removably attaching together the fastening apertures of the frame and the tie-down assembly.

4. The assembly of claim 1, further comprising:
   mounting apertures formed in the L-shaped frame for receiving the strap.

5. The assembly of claim 1, further comprising:
   a tensioning mechanism attached to the strap for imparting a tension to the strap.

6. The assembly of claim 5, further comprising:
   at least one fastener attached to an end of the strap.

7. The assembly of claim 5, further comprising:
   a pair of fasteners attached to ends of the strap.

* * * * *